(12) United States Patent
Schmidt et al.

(10) Patent No.: US 11,635,132 B2
(45) Date of Patent: Apr. 25, 2023

(54) COAXIAL TRANSMISSION

(71) Applicant: WITTENSTEIN SE, Igersheim (DE)

(72) Inventors: Michael Schmidt, Reichenberg (DE); Thomas Bayer, Igersheim (DE); Heiko Schreiber, Doberschau (DE)

(73) Assignee: WITTENSTEIN SE, Igersheim (DE)

( * ) Notice: Subject to any disclaimer, the term of this patent is extended or adjusted under 35 U.S.C. 154(b) by 100 days.

(21) Appl. No.: 17/088,882

(22) Filed: Nov. 4, 2020

(65) Prior Publication Data
US 2021/0131545 A1    May 6, 2021

(30) Foreign Application Priority Data
Nov. 4, 2019   (DE) .................... 10 2019 129 660.9

(51) Int. Cl.
*F16H 49/00*   (2006.01)
*F16H 57/00*   (2012.01)
*F16H 25/06*   (2006.01)

(52) U.S. Cl.
CPC ........... *F16H 49/001* (2013.01); *F16H 25/06* (2013.01); *F16H 57/00* (2013.01); *F16H 2049/003* (2013.01); *F16H 2057/0056* (2013.01)

(58) Field of Classification Search
CPC .... F16H 23/10; F16H 25/06; F16H 2055/173; F16H 49/001; F16H 2049/003; F16H 2049/006; F16H 2057/0056
See application file for complete search history.

(56) References Cited

U.S. PATENT DOCUMENTS

| | | | |
|---|---|---|---|
| 1,543,791 A * | 6/1925 | Pitter | F16H 25/06 475/180 |
| 4,798,104 A | 1/1989 | Chen et al. | |
| 8,307,738 B2 * | 11/2012 | Schmidt | F16H 25/06 74/640 |
| 10,100,913 B2 * | 10/2018 | Schreiber | F16H 49/001 |

FOREIGN PATENT DOCUMENTS

| | | | |
|---|---|---|---|
| CH | 96719 A | * 11/1922 | |
| DE | 341053 C | 9/1921 | |
| DE | 3930064 A1 | * 9/1989 | F16H 49/001 |

(Continued)

OTHER PUBLICATIONS

European search report for patent application No. 20205191.8 dated Jan. 29, 2021.

(Continued)

*Primary Examiner* — Joseph Brown
(74) *Attorney, Agent, or Firm* — Bachman & LaPointe, P.C.

(57) ABSTRACT

Coaxial gear mechanism (1), with a toothing (5) oriented axially relative to a rotational axis (3) of the coaxial gear mechanism (1), a tooth carrier (7) with axially oriented guides (9), teeth (11) which are received in the guides (9) for engagement with the toothing (5), wherein the teeth are oriented with their respective longitudinal axes (13) axially in the guides (9) and are mounted so as to be axially movable in the guides (9), and a cam disk (15) which is rotatable about the rotational axis (3) for axially driving the teeth (11), wherein a plurality of bearing segments (17) is arranged between the cam disk (15) and the teeth (11) for supporting the teeth (11).

16 Claims, 4 Drawing Sheets

(56) References Cited

FOREIGN PATENT DOCUMENTS

| DE | 3930064 A1 * | 3/1991 | | |
|---|---|---|---|---|
| DE | 3930064 A1 | 3/1991 | | |
| DE | 102006042786 A1 | 3/2008 | | |
| DE | 102007011175 A1 | 9/2008 | | |
| DE | 102013011799 A1 | 1/2015 | | |
| DE | 102015105520 A1 * | 10/2016 | ........... | F16H 49/001 |
| DE | 102015105524 A1 | 10/2016 | | |
| DE | 102015105536 A1 | 10/2016 | | |
| DE | 102015119584 A1 | 5/2017 | | |
| EP | 4023907 A1 | 7/2022 | | |

OTHER PUBLICATIONS

Office Action dated Sep. 23, 2022 for corresponding EP Patent Application No. 20205191.8.

* cited by examiner

COAXIAL TRANSMISSION

BACKGROUND OF THE INVENTION

The invention concerns a coaxial gear mechanism and a method for manufacturing a coaxial gear mechanism.

Gear mechanisms are known from the prior art comprising teeth which are mounted so as to be radially movable in a tooth carrier. To drive the teeth in a radial direction, drive elements with a profiling are used, such as for example cam disks. The teeth are moved in the radial direction and engage in a toothing so as to cause a relative movement between the tooth carrier with the teeth and the toothing. The relative movement between the toothing and the teeth is smaller by at least one order of magnitude than the movement of the drive element with the profiling. In this way, high translation ratios can be achieved; one example of such a gear mechanism is disclosed in DE 10 2007 011 175 A1.

However, previously known solutions from the prior art have restrictions with respect to the transmission of torque, or have a high number of individual components, or require complex assembly.

SUMMARY OF THE INVENTION

The object of the invention is to specify a coaxial gear mechanism which is improved in comparison with coaxial gear mechanisms known from the prior art, wherein in particular, higher torques can be transmitted or a simpler construction is achieved with a smaller number of components, or simplified assembly. It is furthermore an object of the invention to indicate a method for manufacturing such a coaxial gear mechanism.

This object is achieved with a coaxial gear mechanism as disclosed herein and a method as also disclosed herein. Advantageous refinements and embodiments arise from the subclaims and from this description.

One aspect of the invention concerns a coaxial gear mechanism, with a toothing oriented axially relative to a rotational axis of the coaxial gear mechanism, a tooth carrier with axially oriented guides, teeth which are received in the guides for engagement with the toothing, wherein the teeth are oriented with their respective longitudinal axes axially in the guides and are mounted so as to be axially movable in the guides, and a cam disk which is rotatable about the rotational axis for axially driving the teeth, wherein a plurality of bearing segments is arranged between the cam disk and the teeth for supporting the teeth.

A further aspect of the invention concerns a method for manufacturing a coaxial gear mechanism according to one of the typical embodiments described herein, wherein the teeth are inserted in the bearing segments before the teeth are pressed into the guides.

Typically, expressions used herein such as "axial", "radial" or "circumferential direction" should be understood as relative to the rotational axis of the coaxial gear mechanism, for example with respect to the rotational axis of the cam disk of the coaxial gear mechanism.

In typical embodiments, the guides of the tooth carrier are oriented axially with respect to the rotational axis of the coaxial gear mechanism. Typically, the teeth are mounted so as to be axially movable in the guides of the tooth carrier. Typically, the teeth are mounted in the tooth carrier such that each can be moved in precisely one direction, typically in the direction of the longitudinal axis of the tooth. This may be achieved for example in that the tooth has a constant cross-section in the movement direction over a specific length, in particular over a specific length along the longitudinal axis of the tooth. Typically, the guide for the tooth is formed in the tooth carrier as a slot or opening with a cross-section which remains constant in the axial direction. In particular, the guide is configured as a bore.

Typical tooth carriers comprise guides which each have a tooth base opening on a tooth base side of the tooth carrier, and a tooth head opening on a tooth head side of the tooth carrier. Typically, the tooth base opening is oriented in the direction of the cam disk, and the tooth head opening is oriented in the direction of the toothing. This allows the teeth to be received such that the teeth are mounted in the guide so as to be axially movable along their respective longitudinal axis with respect to the rotational axis of the coaxial gear mechanism. The longitudinal axis of a tooth typically runs from a tooth base of the tooth to a tooth head of the tooth. Typically, the teeth are mounted with their tooth bases on bearing segments which in turn are mounted on the cam disk. In typical embodiments, the tooth carrier is circular or annular. Typical guides for the teeth in the tooth carrier are formed as passage openings or passage bores. Further typical tooth carriers comprise rectangular milled recesses or elongate holes or slots as guides.

In typical embodiments, the coaxial gear mechanism comprises a cam disk with a profiling as a drive element for axially driving the teeth, in particular by axially lifting the teeth. Typically, the profiling is configured along the circumferential direction of the cam disk with at least one protrusion in the axial direction, in particular with at least two or at least three protrusions. The rotary drive of the cam disk with the profiling causes a force to be exerted on the teeth via the bearing segments in the direction of the respective longitudinal axis of the teeth, so that the teeth are pressed out of the guides in the axial direction on the tooth head side of the tooth carrier.

Typical coaxial gear mechanisms comprise an axially oriented toothing. In particular, the toothing may be configured as the toothing of a crown gear.

Typical coaxial gear mechanisms have a drive input shaft and an output shaft. Typically, the drive input shaft and the output shaft are mounted so as to be rotatable about the rotational axis of the coaxial gear mechanism. Typically, the drive input shaft or the output shaft or both are configured as hollow shafts. Typically, the cam disk is provided on the drive input shaft. In typical embodiments, the tooth carrier is provided on the output shaft, wherein in particular the toothing or a crown gear with the toothing is connected rotationally fixedly to a housing of the coaxial gear mechanism, or is not rotatable relative to the housing. In further typical embodiments, a toothing or a crown gear with the toothing is provided on the output shaft, wherein in particular a tooth carrier is rotationally fixedly connected to a housing of the coaxial gear mechanism, or is not rotatable relative to the housing.

In typical embodiments of the coaxial gear mechanism according to the invention, at least some of the teeth are configured so as to be bend-resistant. The term bend-resistant should be typically understood technically, i.e. the bending of the teeth is so small, because of the stiffness of the tooth material, that it is at least substantially insignificant for the kinematics of the coaxial gear mechanism. Bend-resistant teeth in particular comprise teeth which are made of a metal alloy, in particular steel or a titanium alloy, a nickel alloy or other alloys. Furthermore, bend-resistant teeth made of plastic may be provided, in particular in coaxial gear mechanisms in which also at least one of the following components is also made of plastic: toothing, tooth carrier and drive element. In typical embodiments, the tooth carrier and the teeth are made of a metal alloy, or additionally also the toothing, or further additionally the drive element, are made of a metal alloy. Such coaxial gear mechanisms offer the advantage that they are extremely twist-resistant and can bear high loads. Coaxial gear mechanisms made of plastic offer the advantage of having a low weight. The expression "bend-resistant" in particular means a bending resistance about a transverse axis of the tooth. This means in particular that, when the tooth is viewed as a bar from a tooth base to a tooth head, there is a bending resistance which at least substantially excludes bending deformations between the tooth head and tooth base. The bend-resistance ensures an extremely high load-bearing capacity and twist-resistance of the coaxial gear mechanism.

The toothing and the teeth typically have curved flanks. Examples of a curvature of the flanks are a cylindrical curvature, a curvature of the flanks along a helix or helical surface about the rotational axis of the coaxial gear mechanism, or a curvature in the form of a logarithmic spiral. For a possible embodiment of a curvature in the form of a logarithmic spiral, reference is made to DE 10 2007 011 175 A1. The curved surface offers the advantage that the mutually engaged flanks bear against each other over a large surface area and not merely along a line or point. In this way, an extreme stiffness is achieved on force transmission between the toothing and the teeth. The term "flanks" here means in particular the tooth flanks of the teeth or the flanks of the toothing.

In typical embodiments, in a first end region of the tooth facing the toothing, a tooth has a tooth head with tooth flanks. Typically, in a second end region of the tooth facing the cam disk, the tooth has a tooth base. The tooth base typically has a tooth base bulge. Typically, the tooth base bulge is configured for mounting the tooth in a tooth hollow of a bearing segment.

In typical embodiments, between the tooth head and the tooth base, the tooth comprises a tooth body. The tooth body extends along the longitudinal axis of the tooth over a body length. Typically, the tooth body has an at least substantially constant cross-section over the body length, apart from lubricating channels or similar.

In typical embodiments, the tooth is configured as a round tooth. For example, the tooth body of a tooth has an at least substantially constant circular cross-section. Typically, the tooth body is designed at least substantially cylindrical.

In further typical embodiments, a tooth is configured as a flat tooth. Flat teeth are typically guided in guides with non-round cross-section in the tooth carrier. In typical embodiments, the tooth has a width, for example in the radial direction of the coaxial gear mechanism, which is at least twice as large as the thickness, for example in the circumferential direction of the coaxial gear mechanism. Further embodiments comprise round, circular or oval teeth, or round teeth with flattenings.

In typical embodiments, a plurality of bearing segments is arranged between the cam disk and the teeth. Typically, the bearing segments are configured for supporting the teeth on the cam disk. In typical embodiments, the bearing segments are arranged in a ring form. Typically, the bearing segments are arranged adjacent to each other in the circumferential direction.

Typically, each of the teeth of the coaxial gear mechanism is supported on a respective one of the bearing segments. In further typical embodiments, at least one tooth is mounted on one of the bearing segments, in particular two teeth or at least three teeth in each case.

In typical embodiments, at least two of the bearing segments are connected together, in particular connected together integrally. For example, at least two of the bearing segments are produced integrally. In particular, at least three, at least four or all the bearing segments of the coaxial gear mechanism are connected together or produced integrally. Typically, bearing segments connected together are connected together elastically, for example by a flexure hinge, in particular so as to be bendable in order to follow a lift movement of the cam disk in the axial direction.

In typical embodiments, a flexure hinge connecting two bearing segments together is configured as a nominal break point. For example, after mounting of the coaxial gear mechanism, it may no longer be necessary for the bearing segments to be linked together. In particular, after breakage of the flexure hinge at the nominal break point, the bearing segments may be connected together via a floating joint, in particular by form fit.

In typical embodiments, bearing segments are connected together in articulated fashion, in particular fixedly or loosely. Typically, the bearing segments are connected together fixedly, in particular so that they cannot be separated from each other. Typically, the bearing segments are movable relative to each other and in particular configured to follow a lift movement of the cam disk in an axial direction. In further typical coaxial gear mechanisms, the bearing segments are configured as individual floating bearing segments.

In typical embodiments, the bearing segments each have a tooth hollow for receiving a respective tooth supported on the bearing segment. Typically, the bearing segments each have a tooth hollow. Typically, the tooth hollow has a depression in the axial direction. A tooth of the coaxial gear mechanism may be received in the depression. For example, the tooth hollow may be configured as a dish open on one side. Typically, the edge of the tooth hollow is designed to be rectangular or oval. In this way, for example, a pivot movement of the bearing segment relative to the tooth is possible.

Typically, the bearing segments comprise webs, wherein the webs each connect a first bearing segment with an adjacent bearing segment. In particular, a web may be arranged on the side of the bearing segments facing the tooth carrier, or be arranged centrally with respect to the axial width of the bearing segments. Typically, the web has an axial thickness which is smaller than the axial width of a bearing segment. Typically, the web tapers relative to the bearing segment. Typically, the web of a bearing segment is configured as a flexure hinge. In particular, the web has a smaller bend-resistance than a tooth hollow of the bearing segment. In particular, the web is configured to provide a movability of the bearing segments relative to each other, in particular a movability in the axial direction.

Typically, the teeth are connected to the bearing segments via a respective latching mechanism, in particular are secured against falling out of the bearing segments. Typically, a tooth and a bearing segment are connected movably together. For example, the tooth and the bearing segment may be connected together by form fit or by an undercut or a clip. Bearing segments and teeth which are connected together may in particular facilitate or simplify assembly of a typical coaxial gear mechanism.

In typical embodiments, the teeth each have at least one notch, in particular at least two notches. Typically, the bearing segments each have at least one clip which is designed for form-fit or force-fit engagement with the tooth, in particular with the at least one notch of the tooth.

Typically, the at least one notch of the tooth is formed in a tooth base region of the tooth. The tooth base region of the tooth typically protrudes from a guide of the tooth carrier.

In typical embodiments, a tooth hollow of a bearing segment is rounded on the inside with a first pivot radius, in particular in the circumferential direction. In typical embodiments, a tooth of the coaxial gear mechanism has a tooth base bulge on the tooth base of the tooth, in particular a tooth base bulge with a second pivot radius. In particular, the tooth base bulge may be formed semicylindrical with a second pivot radius, wherein a cylinder axis of the semicylindrical form is oriented for example in a radial direction with respect to the rotational axis of the coaxial gear mechanism. Typically, the second pivot radius is at least substantially equal to the first pivot radius. Typically, the tooth with the tooth base bulge stands in the tooth hollow. In this way, for example, a pivot movement of the bearing segment relative to the tooth becomes possible, in particular a pivot movement about a direction standing radially relative to the rotational axis of the coaxial gear mechanism.

Typically, the bearing segments have a plain bearing face for sliding support of the bearing segments on the cam disk. In particular, the bearing segments each have a plain bearing face. In typical embodiments, the bearing segments have at least one lubricant groove on the side of the bearing segment facing the cam disk. Typically, the lubricant groove is formed at the border between two adjacent bearing segments. In particular, the lubricant groove may be limited physically by two adjacent bearing segments and a web. Typically, the lubricant groove extends in the radial direction between two bearing segments. The lubricant groove may in particular facilitate the introduction of a lubricant into a lubricant gap between the plain bearing face of one bearing segment and a profiling slide face of the profiling. Via the lubricant groove, for example, an exchange of lubricant between the lubricant gap and a gear mechanism interior of the coaxial gear mechanism, can be improved. In particular, the lubricant groove and in particular the plain bearing face may be optimized for a hydrodynamic slide bearing function.

Typically, on the side facing the cam disk of the bearing segment, a bearing segment comprises a plain bearing face and a groove face. The profiling of the cam disk typically has a profiling slide face facing the bearing segments, on which the bearing segments rest with their respective plain bearing faces. The plain bearing faces are typically oriented at least substantially parallel to the profiling slide face of the profiling. The groove face is typically tilted in the axial direction relative to the profiling slide face. In particular, a bearing segment has two groove faces, for example one groove face on each side of the plain bearing face in the circumferential direction. In particular, two groove faces flank a lubricant groove. Typically, the transition between the plain bearing face and the groove face is rounded in the circumferential direction, typically rounded with a radius.

In typical embodiments, the bearing segments are made of plastic or metal. Typically, the bearing segments are produced by a molding process or a forming process. In typical embodiments, the bearing segments are made from plastic in a molding process in a plastic injection molding process, in a chilled casting process or die-casting process, or by a metal powder injection molding (MIM) process. In further typical embodiments, the bearing segments are made from metal in a deep-drawing process. Typically, the bearing segments are made of steel, bronze or aluminum, in particular with coatings.

In typical embodiments, the parts of the coaxial gear mechanism are made of plastic, metal or a plastic-metal composite. Typically, the parts of the coaxial gear mechanism, in particular the toothing, tooth carrier, bearing segments, teeth or cam disk, are produced by a molding or forming process. In exemplary embodiments of a coaxial gear mechanism, the parts of the coaxial gear mechanism, except the teeth and cam disk, may be made of plastic or a plastic-metal composite, wherein the teeth and the cam disk are made of metal. In further exemplary embodiments, the parts of a coaxial gear mechanism, except the bearing segments, may be made of steel, wherein the bearing segments are made of plastic.

In typical embodiments, the bearing segments each have an at least substantially constant wall thickness. In particular, the tooth hollows or the webs, in particular the tooth hollows and the webs, may have an at least substantially constant wall thickness. For example, bearing segments with an at least substantially constant wall thickness may be particularly suitable for manufacture in an injection molding process or deep-drawing process.

In typical embodiments, the guides with the teeth arranged therein are arranged along at least two concentric rings, in particular along at least two concentric rings with different ring diameters. Typically, the at least two concentric rings run concentrically about the rotational axis of the coaxial gear mechanism. Typically, the bearing segments are arranged along or axially offset to the at least two concentric rings.

Typically, the teeth of the coaxial gear mechanism comprise first teeth which are arranged in the circumferential direction along a first ring of the at least two concentric rings, and second teeth which are arranged along a second ring of the at least two concentric rings, wherein the first ring has a smaller ring diameter than the second ring. Typically, the first teeth have a smaller tooth diameter, in cross-section to the longitudinal axis of the teeth, than the second teeth. Typically, the first bearing segments, which are arranged along or axially offset to the first ring, each have smaller tooth hollows than second bearing segments, which are arranged along or axially offset to the second ring. In further typical embodiments, the first teeth and the second teeth have the same tooth diameter in cross-section to the longitudinal axis of the teeth. Typically, the number of first teeth is equal to the number of second teeth. Typically, the number of first bearing segments is equal to the number of second bearing segments.

In typical embodiments, the first bearing segments are movable relative to the second bearing segments. In particular, the first bearing segments are separated from the second bearing segments by a ring gap, or are arranged so as to slide on the second bearing segments. In further typical embodiments, the first bearing segments are connected to the second bearing segments, in particular in articulated fashion, for example by a flexure hinge, in particular by webs. In particular, the first bearing segments and the second bearing segments may be produced integrally.

Typically, the first teeth are arranged offset to the second teeth in the circumferential direction. Typically, the first teeth are each arranged centrally between two respective second teeth in the circumferential direction. By offsetting the first teeth relative to the second teeth, in particular different lift movements may result. For example, an offset may ensure a more favorable transfer of forces into the tooth carrier or a smaller space requirement or a higher power density. In particular, an offset may allow the use of a larger hollow shaft. In further typical embodiments, the first teeth and the second teeth are each arranged at the same angles with respect to the rotational axis of the coaxial gear mechanism.

In further typical embodiments, the guides with the teeth arranged therein are arranged along precisely one ring. Typically, the bearing segments are arranged along or axially offset to the one ring. The single row arrangement of the teeth may in particular allow a reduction in the number of teeth, or reduce the complexity of the coaxial gear mechanism. In particular, a particularly large hollow shaft may be used.

In typical methods of manufacturing a coaxial gear mechanism, the teeth are inserted in the bearing segments. Typically, the bearing segments are connected together, in particular to form a complete ring. Typically, the teeth are latched into the bearing segments, for example via a latching mechanism. In typical embodiments, the tooth carrier is pressed onto the toothing. Typically, the bearing segments with the teeth are pressed into the tooth carrier. Typically, while the bearing segments with the teeth are being pressed into the tooth carrier, the teeth are pressed into the guides of the tooth carrier. Typically, the cam disk is pressed onto the bearing segments. In particular, the parts of the coaxial gear mechanism, in particular the toothing, the tooth carrier, the bearing segments with teeth, and the cam disk, are pressed onto or into each other in the axial direction.

Typical embodiments of the coaxial gear mechanism offer the advantage over the prior art that the coaxial gear mechanism can transmit a higher torque. In particular, a larger hollow shaft or larger bearing may be fitted. A further advantage may be that the coaxial gear mechanism has a reduced number of components. In particular, the bearing segments may be connected together during manufacture, for example in the form of a ring. Typical coaxial gear mechanisms may offer the further advantage that assembly of the coaxial gear mechanism is simplified. In particular, all main components may be pressed onto or into each other in the axial direction. In particular, parts of the coaxial gear mechanism may be assembled or adjusted fully or partly automatically. One advantage may be that the teeth are connected to the bearing segments for example via a latching mechanism, and can be mounted as a unit, in particular by pressing into the tooth carrier. Assembly may thereby be simplified, and mounting times and costs reduced. A further advantage of typical coaxial gear mechanisms may be that parts of the coaxial gear mechanism, for example the bearing segments or tooth carrier, may be produced by low-cost production processes. In particular, it may be an advantage that parts of the coaxial gear mechanism are suitable for axial removal from the mold.

BRIEF DESCRIPTION OF THE DRAWINGS

The invention is explained in more detail below with reference to the attached drawings, wherein the figures show.

DETAILED DESCRIPTION

Typical embodiments of the invention are described below with reference to the figures, wherein the invention is not restricted to the exemplary embodiments but rather the scope of the invention is determined by the claims. In the description of the embodiments, under certain circumstances the same reference signs are used for the same or similar parts in different figures and different embodiments. In some cases, features which have already been described in connection with other figures may be not described again for the sake of clarity. For the sake of clarity, in some cases not all such features carry reference signs, for example the bearing segments (reference sign 17 in FIGS. 1-5).

Figure 1:
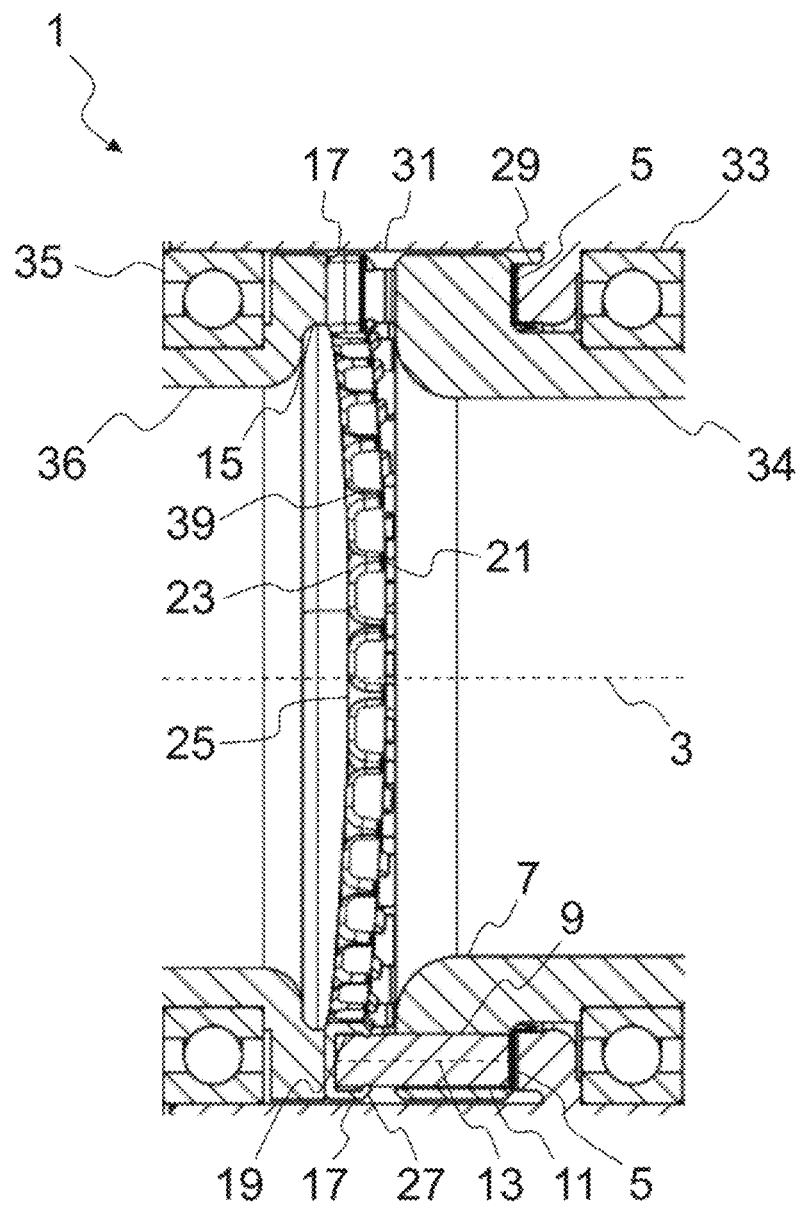
FIG. 1 a typical embodiment of the coaxial gear mechanism in a schematic sectional view.

FIG. 1 shows an extract from a typical embodiment of the invention in a schematic sectional view. FIG. 1 shows a coaxial gear mechanism 1 with a toothing 5 which is oriented with respect to a rotational axis 3 of the coaxial gear mechanism 1. The toothing 5 is formed as a toothing of a crown gear 29 running around the rotational axis 3. The crown gear 29 is rotationally fixedly connected to a housing 31 of the coaxial gear mechanism 1.

The coaxial gear mechanism 1 comprises a tooth carrier 7 provided on an output shaft 34. The output shaft 34 is mounted on the housing 31 via a first bearing 33 so as to be rotatable about the rotational axis 3. The tooth carrier has axially oriented guides 9 in which respective teeth 11 are received. The teeth 11 are mounted in the guides 9 so as to be movable axially with respect to the rotational axis 3 along their respective longitudinal axes 13.

The teeth 11 each comprise a tooth head designed for engagement with the toothing 5, and a tooth base which protrudes from the guide 9 of the respective tooth 11 and is supported on a bearing segment 17. A tooth 11 furthermore comprises a tooth body between the tooth base and the tooth head, wherein the tooth body is received at least partially in the guide 9 of the tooth 11. The tooth base of the tooth 11 stands in a tooth hollow 19 of the bearing segment 17. The bearing segment 17 and the tooth 11 are connected together via a latching mechanism. In FIG. 1, the latching mechanism is provided by a clip 27 of the bearing segment 17 and two notches (see FIGS. 6A-C) of the tooth 11.

Each bearing segment 17 of the plurality of bearing segments 17 has a tooth hollow 19 which is configured as a depression in the axial direction. The tooth hollows 19 are each rounded with a first pivot radius in the circumferential direction. In each case, two bearing segments 17 are connected together by a web 21 of the bearing segments 17. In particular, the web 21 connects a respective tooth hollow 19 of a first bearing segment 17 with the tooth hollow 19 of an adjacent bearing segment 17.

The bearing segments 17 are each supported via a plain bearing face 23 on a profiling 25 of a cam disk 15 of the coaxial gear mechanism 1. The cam disk 15 is provided on an drive input shaft 36. The drive input shaft 36 is mounted on the housing 31 so as to be rotatable about the rotational axis 3 via a second bearing 35. The profiling 25 is designed running around the rotational axis 3 and in FIG. 1 has an axial protrusion in the direction of the teeth 11. The bearing faces, in particular the plain bearing faces 23 and a profiling slide face of the profiling 25, are lubricated with a lubricant. The plain bearing face 23 of a bearing segment 17 is provided on the side of the tooth hollow 19 of the bearing segment 17 facing the profiling 25.

Between the plain bearing faces 23 of two adjacent bearing segments 17, the bearing segments 17 have a lubricant groove 39. The lubricant groove 39 between the plain bearing faces 23 of two adjacent bearing segments 17 is bridged by a web 21 between two adjacent bearing segments 17. For example, the introduction of lubricant into a lubricant gap between the plain bearing face 23 and a profiling slide face of the profiling 25 may be improved by the lubricant gap 39.

Figure 2:
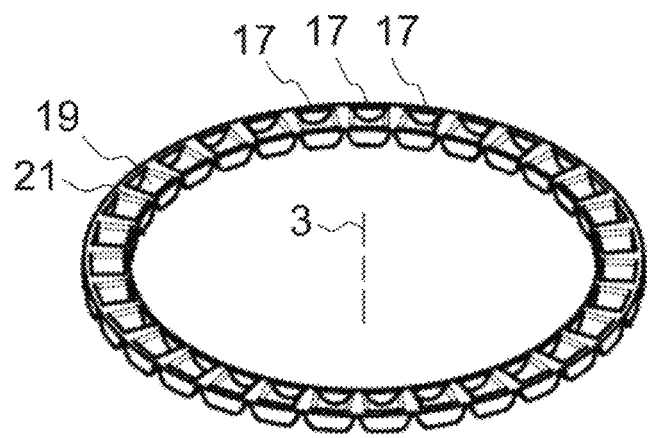
FIG. 2 a schematic view of a plurality of bearing segments of a typical coaxial gear mechanism.
Figure 3:
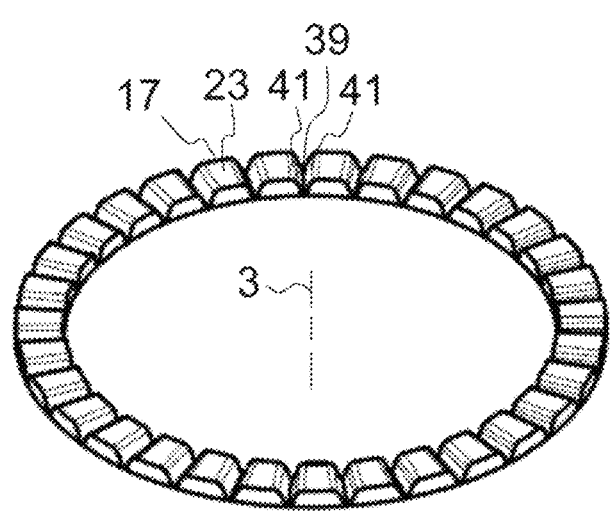
FIG. 3 a further schematic view of a plurality of bearing segments.

FIGS. 2 and 3 show views of a plurality of bearing segments 17 of a typical coaxial gear mechanism. The bearing segments 17 are connected together in a ring form. In particular, the bearing segments 17 are arranged along a ring which is concentric with the rotational axis 3 of the coaxial gear mechanism 1. FIG. 2 shows a view of the side of the bearing segments 17 facing the teeth of the coaxial gear mechanism. The bearing segments 17 each comprise a tooth hollow 19 and a web 21. The tooth hollow 19 is formed as a dish which is open in the direction of the teeth of the coaxial gear mechanism and is designed to receive the teeth. The tooth hollows 19 are each rounded with a first pivot radius in the circumferential direction. The tooth hollows 19 and the webs 21 have an at least substantially constant wall thickness.

FIG. 3 shows a view of the side of the bearing segments 17 facing the profiling of the cam disk. The tooth hollows 19 of the bearing segments 17 each have a plain bearing face 23 on the side facing the profiling. Typically, the plain bearing faces 23 lie on a profiling slide face of the profiling. The plain bearing faces 23 are each oriented locally, i.e. at the point of the profiling slide face at which a plain bearing face 23 lies on the profiling slide face of the profiling, at least substantially parallel to the profiling slide face of the profiling. Between the plain bearing faces 23 of two adjacent bearing segments 17, the two bearing segments 17 have a lubricant groove 39. The lubricant groove 39 extends in the radial direction along the bearing segments 17. A plain bearing face 23 is flanked by two groove faces 41, wherein the groove faces 41 are rounded or tilted relative to the profiling slide face of the profiling. In FIG. 3, the lubricant groove 39 is axially delimited in the direction of the teeth by the web 21.

Figure 4:
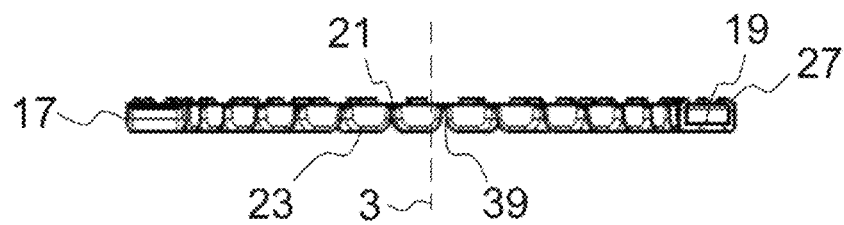
FIG. 4 a schematic sectional view of a plurality of bearing segments.

FIG. 4 shows a sectional view of a plurality of bearing segments 17 arranged in a ring form. The bearing segments 17 each comprise a tooth hollow 19 and a clip 27. The clip 27 is designed elastically so that, during insertion of a tooth in the tooth hollow, the clip 27 may deform elastically. The clip 27 is configured to engage in notches (FIGS. 6A-C) of a tooth pressed into the tooth hollow 19, and to latch in the notches.

Figure 5:
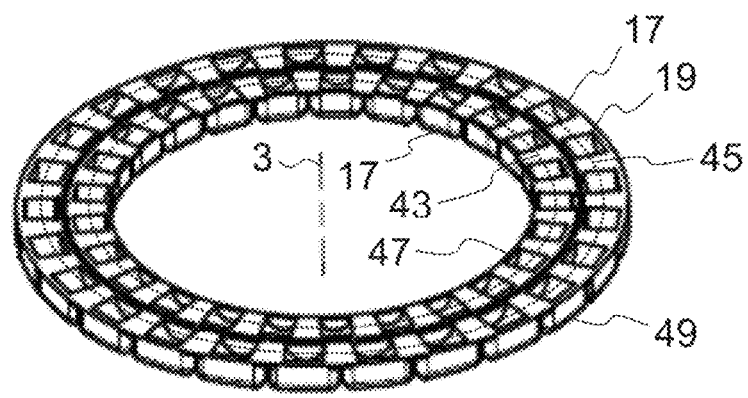
FIG. 5 a schematic view of a plurality of bearing segments arranged along two concentric rings.

FIG. 5 shows a plurality of bearing segments 17 which are arranged in two rows along two concentric rings around the rotational axis 3 of a coaxial gear mechanism. First bearing segments 47 of the bearing segments 17 are arranged along a first ring 43 of the two concentric rings. Second bearing segments 49 of the bearing segments 17 are arranged along a second ring 45 of the two concentric rings. The first ring 43 has a smaller ring diameter than the second ring 45. The first bearing segments 47 each have a smaller tooth hollow 19 than the second bearing segments 49. In particular, the first bearing segments 47 are configured for supporting first teeth, and the second bearing segments 49 for supporting second teeth, wherein the first teeth have a smaller diameter than the second teeth. In the exemplary embodiment of FIG. 5, the first bearing segments 47 are movable in the circumferential direction relative to the second bearing segments 49.

Figure 6A:
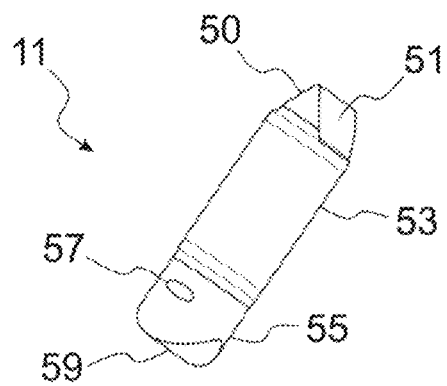
FIGS. 6A-C in each case, a perspective schematic view of a tooth of a typical embodiment.
Figure 6B:
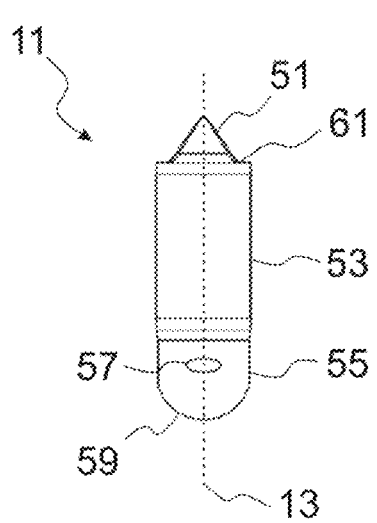
Figure 6C:
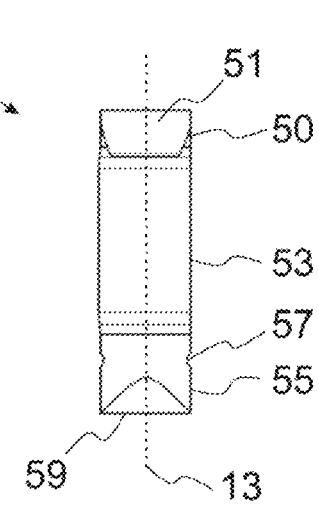

FIGS. 6A to 6C show schematic views of a tooth 11 of a typical coaxial gear mechanism in an exemplary embodiment, and are described jointly below. FIG. 6B shows a side view of the tooth profile of the tooth 11, and FIG. 6C shows a side view perpendicular to the viewing plane of FIG. 6B. The tooth 11 comprises a tooth head 50 with tooth flanks 51 which are configured for engagement with a toothing of the coaxial gear mechanism.

The tooth 11 comprises a tooth body 53 which is provided to be received in a guide of the tooth carrier. The tooth body 53 has an at least substantially constant diameter in cross-section to the longitudinal axis 13 of the tooth 11, and a circular cross-section. The exemplary embodiment of FIGS. 6A-C has a shoulder 61 which extends back from the tooth body 53, inwardly in the direction of the longitudinal axis 13, at the transition between the tooth head 50 and the tooth body 53.

Typically, at least part of a tooth base 55 of the tooth 11 protrudes from the guide of the tooth carrier. In FIGS. 6A-C, the tooth base 55 of the tooth 11 has two notches 57. The notches 57 are designed to connect the tooth 11 to a bearing segment of the coaxial gear mechanism via a latching mechanism, in particular via a form-fit or force-fit connection to a clip of the bearing segment. The tooth base 55 has a tooth base bulge 59. The tooth base bulge 59 is shown in FIGS. 6A-C as a semicylindrical bulge in the direction of the longitudinal axis 13. The tooth base bulge 59 is designed with a second pivot radius. The tooth base bulge 59 is designed to be received in a tooth hollow of a bearing segment, wherein the tooth hollow is rounded with a first pivot radius which at least substantially corresponds to the second pivot radius of the tooth base bulge 59.

The tooth base 55 is tapered relative to the tooth body 53. The transitional region between the tooth base 55 and the tooth body 53 slopes slightly relative to a longitudinal axis 13 of the tooth 11. The edges between the tooth base 55 and the tooth body 53 are rounded. The tooth 1 thus bears on a guide of the tooth carrier only in the region of the tooth body 53. Because of the taper of the tooth 11 from the tooth body 53 to the tooth base 55, lubricant for example may be drawn into the guide and thus the tooth can be lubricated against the guide.

Figure 7:
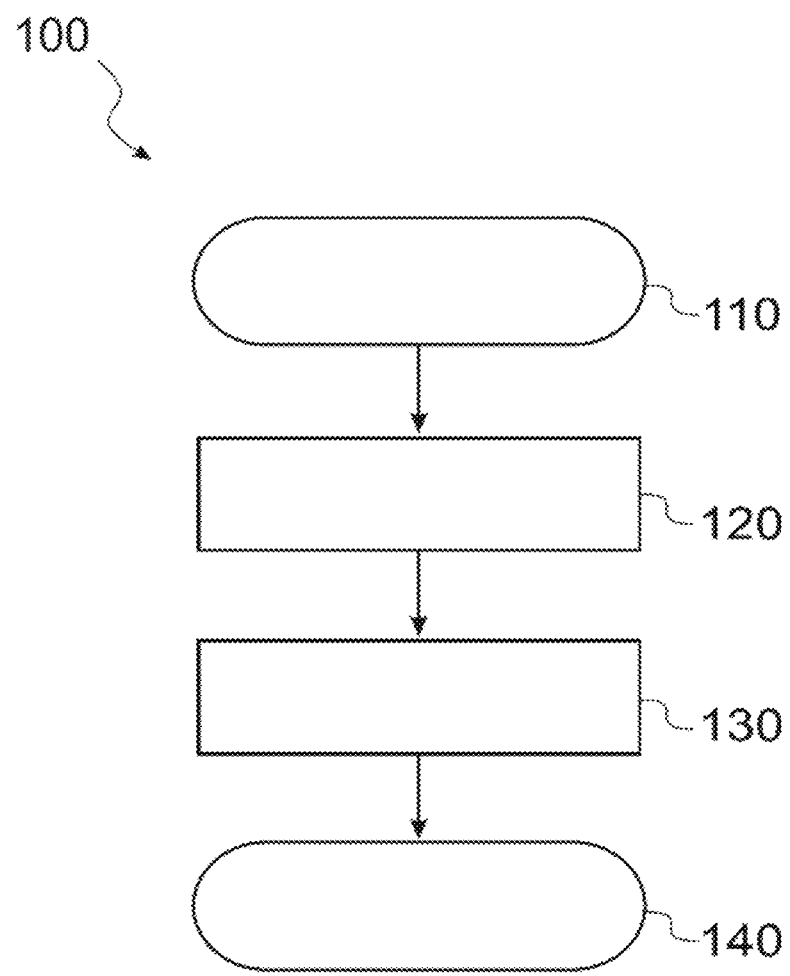
FIG. 7 schematically, a typical method for manufacture of the coaxial gear mechanism.

FIG. 7 shows schematically a typical method 100 for manufacturing a coaxial gear mechanism. At step 110, respective teeth are inserted in a bearing segment, wherein the teeth engage with the respective bearing segment. The bearing segments are connected together into a ring. At step 120, a tooth carrier of the coaxial gear mechanism is pressed in the axial direction onto a toothing of the coaxial gear mechanism, in particular pressed onto the toothing in a housing of the coaxial gear mechanism. At step 130, the bearing segments with the teeth are pressed into the tooth carrier. The teeth which are latched to the bearing segments are pressed in the axial direction into guides of the tooth carrier. At step 140, a cam disk with a profiling is pressed onto the bearing segments. In particular, plain bearing faces of the bearing segments come into contact with a profiling slide face of the profiling. In this way, for example, a sliding support of the bearing segments and teeth in the circumferential direction on the cam disk is provided.

The invention claimed is:

1. A coaxial gear mechanism (1), comprising:
   a toothing (5) oriented axially relative to a rotational axis (3) of the coaxial gear mechanism (1), a tooth carrier (7) with axially oriented guides (9), teeth (11) which are received in the guides (9) for engagement with the toothing (5), wherein the teeth (11) are oriented with their respective longitudinal axes (13) axially in the guides (9) and are mounted so as to be axially movable in the guides (9), and a cam disk (15) which is rotatable about the rotational axis (3) for axially driving the teeth (11), wherein a plurality of bearing segments (17) are arranged between the cam disk (15) and the teeth (11) for supporting the teeth (11), and wherein the bearing segments (17) have a plain bearing face (23) for sliding support of the bearing segments (17) on the cam disk (15), and wherein at least two of the bearing segments (17) are connected together as a single, integral component.

2. The coaxial gear mechanism (1) according to claim 1, wherein each of the teeth (11) is supported on a respective one of the bearing segments (17).

3. The coaxial gear mechanism (1) according to claim 1, wherein the single, integral component further comprises at least one integral hinge flexibly connecting between the at least two of the bearing segments (17).

4. The coaxial gear mechanism (1) according to claim 3, wherein all of the bearing segments (17) are formed as a single, integral component having integral hinges connecting adjacent bearing segments and defining a flexible ring.

5. The coaxial gear mechanism (1) according to claim 1, wherein the bearing segments (17) each have a tooth hollow (19) for receiving a respective tooth (11) supported on the bearing segment (17).

6. The coaxial gear mechanism (1) according to claim 1, wherein the bearing segments (17) comprise webs (21), wherein the webs (21) each connect a first bearing segment (17) with an adjacent bearing segment (17).

7. The coaxial gear mechanism (1) according to claim 1, wherein the teeth (11) are connected to the bearing segments (17) via a respective latching mechanism.

8. The coaxial gear mechanism (1) according to claim 1, wherein the bearing segments (17) are made of plastic.

9. The coaxial gear mechanism (1) according to claim 1, wherein the bearing segments (17) each have an at least substantially constant wall thickness.

10. The coaxial gear mechanism (1) according to claim 1, wherein a lubricant groove (39) is formed between two bearing segments (17) on a side facing the cam disk (15).

11. The coaxial gear mechanism (1) according to claim 1, wherein the guides (9) with the teeth (11) arranged therein are arranged along at least two concentric rings.

12. The coaxial gear mechanism (1) according to claim 11, wherein the bearing segments (17) are arranged along or axially offset to the at least two concentric rings.

13. The coaxial gear mechanism (1) according to claim 1, wherein the bearing segments (17) are each supported via the plain bearing face (23) on a profiling (25) of the cam disk (15) of the coaxial gear mechanism.

14. The coaxial gear mechanism (1) according to claim 1, wherein a profiling (25) of the cam disk (15) has a profiling slide face facing the bearing segments (17), on which the bearing segments (17) rest with their respective plain bearing faces (23).

15. A coaxial gear mechanism (1), comprising:

a toothing (5) oriented axially relative to a rotational axis (3) of the coaxial gear mechanism (1), a tooth carrier (7) with axially oriented guides (9), teeth (11) which are received in the guides (9) for engagement with the toothing (5), wherein the teeth (11) are oriented with their respective longitudinal axes (13) axially in the guides (9) and are mounted so as to be axially movable in the guides (9), and a cam disk (15) which is rotatable about the rotational axis (3) for axially driving the teeth (11), wherein a plurality of bearing segments (17) are arranged between the cam disk (15) and the teeth (11) for supporting the teeth (11), wherein the teeth (11) each have at least one notch (57), and wherein the bearing segments (17) each have a clip (27) which is designed for form-fit engagement with the at least one notch (57) of the tooth (11).

16. The coaxial gear mechanism (1) according to claim 15, wherein the bearing segments (17) have a plain bearing face (23) for sliding support of the bearing segments (17) on the cam disk (15).

* * * * *